(12) United States Patent
    Vogtmeier

(10) Patent No.: US 11,400,654 B2
(45) Date of Patent: Aug. 2, 2022

(54) SYSTEMS AND METHODS FOR THREE-DIMENSIONAL PRINTING OF SPARE PARTS

(71) Applicant: KONINKLIJKE PHILIPS N.V., Eindhoven (NL)

(72) Inventor: Gereon Vogtmeier, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 409 days.

(21) Appl. No.: 16/490,211

(22) PCT Filed: Feb. 28, 2018

(86) PCT No.: PCT/EP2018/054864
§ 371 (c)(1),
(2) Date: Aug. 30, 2019

(87) PCT Pub. No.: WO2018/158282
PCT Pub. Date: Sep. 7, 2018

(65) Prior Publication Data
US 2021/0402704 A1    Dec. 30, 2021

Related U.S. Application Data

(60) Provisional application No. 62/466,405, filed on Mar. 3, 2017.

(51) Int. Cl.
    *B29C 64/393*    (2017.01)
    *B33Y 50/02*    (2015.01)
    (Continued)

(52) U.S. Cl.
    CPC .......... *B29C 64/393* (2017.08); *B29C 64/153* (2017.08); *B29C 64/268* (2017.08);
    (Continued)

(58) Field of Classification Search
    CPC ... B29C 64/393; B29C 64/153; B29C 64/268; B33Y 50/02; B33Y 10/00; B33Y 30/00
    (Continued)

(56) References Cited

U.S. PATENT DOCUMENTS

2011/0257775 A1\* 10/2011 Crepeau .................. G06F 30/00
                                                                700/98
2014/0144819 A1    5/2014 Verdegan et al.
(Continued)

FOREIGN PATENT DOCUMENTS

EP    2837444 A1    2/2015

OTHER PUBLICATIONS

International Search and Written Opinion for International Application No. PCT/EP2018/054864, filed Feb. 28, 2018, 12 pages.

*Primary Examiner* — Michael J Brown
(74) *Attorney, Agent, or Firm* — Micah-Shalom Kesselman

(57) ABSTRACT

The specification discloses methods and systems for additive manufacturing or 3D printing an object to be used as a licensed spare part for an assembly. A licensor, typically an original equipment manufacturer or approved part supplier provides to a part purchaser of a 3D printed spare part a license to an enhanced computer aided design data file (CAD) used to produce the part. The enhanced CAD file may be provided with security features programmed therein such that it can be used only on 3D printing equipment, and/or at 3D printing locations that are pre-approved or authorized by the licensor.

24 Claims, 3 Drawing Sheets

(51) Int. Cl.
*B29C 64/153* (2017.01)
*B29C 64/268* (2017.01)
*B33Y 10/00* (2015.01)
*B33Y 30/00* (2015.01)

(52) U.S. Cl.
CPC .............. *B33Y 50/02* (2014.12); *B33Y 10/00* (2014.12); *B33Y 30/00* (2014.12)

(58) Field of Classification Search
USPC ........................................................ 700/118
See application file for complete search history.

(56) References Cited

U.S. PATENT DOCUMENTS

| | | |
|---|---|---|
| 2014/0223583 A1 | 8/2014 | Wegner et al. |
| 2014/0244439 A1* | 8/2014 | Cruz ................. G06Q 30/0633 705/26.61 |
| 2015/0064299 A1 | 3/2015 | Koreis |
| 2015/0248678 A1 | 9/2015 | Wee et al. |
| 2016/0260001 A1 | 8/2016 | Flores et al. |
| 2017/0045877 A1* | 2/2017 | Shapiro ................ G05B 19/406 |
| 2017/0123406 A1* | 5/2017 | Birky ................. G05B 19/4099 |

* cited by examiner

SYSTEMS AND METHODS FOR THREE-DIMENSIONAL PRINTING OF SPARE PARTS

CROSS-REFERENCE TO PRIOR APPLICATIONS

This application is the U.S. National Phase application under 35 U.S.C. § 371 of International Application No. PCT/EP2018/054864, filed on Feb. 28, 2018, which claims the benefit of Provisional Application Ser. No. 62/466,405, filed Mar. 3, 2017. These applications are hereby incorporated by reference herein, for all purposes.

TECHNICAL FIELD

The present disclosure is directed generally to three-dimensional printing techniques. More particularly, but not exclusively, the methods and apparatus disclosed herein relate to systems and methods for three dimensional printing of spare parts for existing assemblies, and to the objects produced thereby.

BACKGROUND

Three dimensional ("3D") printing technologies, often termed "additive manufacturing", provides the ability to rapidly and cheaply produce objects would otherwise be difficult, expensive, and time-consuming to produce through the use of conventional manufacturing techniques. 3D objects are created by layering and connecting successive cross-sections of deposited material as described by a digital model file commonly used to direct the operation of 3D printing systems. Various standards exist for such digital model files such as, for example, AMF, STL, and X3D.

A wide variety of 3D printing methods and materials are used to produce a vast array of objects having differing material compositions and characteristics: stereo lithography, fused deposition modeling, selective laser melting, selective laser sintering, direct metal laser sintering, laminated object manufacturing, directed energy deposition, direct ink writing, and fused filament fabrication are a few of the many commonly used 3D printing techniques that offer advantages and disadvantages depending upon the desired object shape and material being used to create it.

3D printing technologies provide the ability for an object, component or part to be designed and readily produced to a manufacturer's specifications at a wide variety of locations. Any place a 3D printer having suitable material printing properties is available can be used to manufacture or produce, for example, a replacement part or component for an assembly. Furthermore, the widespread commercial availability of scanning technologies enables a part or component to be quickly scanned and modeled, and then reproduced through additive manufacturing, with no involvement required from the original equipment manufacturer (OEM). In this situation a manufacturer would have little or no control over the quality of the part or component being produced, and thus a slight degradation in a critical dimension, or the use of an inferior printing material may have a substantial impact on the part quality and thus the overall quality and operation of the assembly to which it belongs.

From the foregoing background it can be readily seen that the production of replacement parts or components through the use of additive manufacturing may become a desirable market in many product areas, albeit one that is fraught with difficulties from the standpoint of the original product manufacturer. Printing a replacement part may be a highly desirable business model, wherein a CAD file is provided to a part purchaser to produce the product on a 3D printer of their choosing. In this business model inventory and shipping costs for parts can be minimized or eliminated altogether. In such a system, a parts retailer or OEM need only supply a 3D printing file to a purchaser who needs a replacement part for a specific component. However, in "on-demand" printing systems such as the ones described herein above there are necessary concerns over the quality of parts being printed, as well as various legal liability issues for both the original manufacturer and part supplier when not having the part produced by the original manufacturer or a licensed or authorized part supplier.

SUMMARY

The present disclosure is related to methods and systems for additive manufacturing or 3D printing an object to be used as a licensed spare part for an assembly. In some aspects of the disclosure a licensor, typically the OEM or approved part supplier provides to a part purchaser of a 3D printed spare part a license to an enhanced computer aided design data file (CAD) used to produce the part. Furthermore, the enhanced CAD file may be provided with security features programmed therein such that it can be used only on 3D printing equipment, and/or at 3D printing locations that are pre-approved or authorized by the licensor. In various aspects of the disclosure, spare parts CAD files may be provided to operate on hybrid 3D printing machines wherein multiple materials and/or combinations of materials are used to manufacture the licensed parts.

In various embodiments, the methods disclosed herein provide a printed object that is produced by 3D printing equipment that is pre-approved by an OEM or a licensed part supplier by the use of an enhanced CAD file that is operable only on such pre-approved equipment. This feature of the disclosure ensure the use of suitable 3D printing materials and techniques to manufacture the part, thereby guaranteeing part quality and thus maintaining OEM control over the overall quality and performance of the replacement part being provided.

In other embodiments, the methods disclosed herein may be used to produce an object or part that is suitable for use as a licensed replacement part without the requirement of carrying inventory or shipping the part to various locations. The enhanced CAD file may be provided directly to the purchaser and/or to a pre-approved 3D manufacturer through an e-commerce transaction so that the ultimate purchaser has the part manufactured at a conveniently located 3D manufacturer and either retrieves the part in person, or has it shipped directly to them.

In other aspects of the disclosure the enhanced CAD file supplied to the purchaser of a replacement part can include various specified manufacturing parameters required for the part, including but not limited to a specified additive manufacturing technique, material or materials used, color, processing parameters, defined equipment for manufacturing, and part dimensions. Furthermore, the enhanced CAD file may include a specified feature such as a three-dimensional printed ID. This printed ID may be positioned inside the volume of the printed part at a specified location, and further may be comprised of a different material, or a material having a differing porosity, so that the ID provides a readily seen or detected feature that confirms the authenticity of the part produced by the system.

Generally, in one aspect, methods are described herein for producing a part through 3D printing techniques that provides an enhanced CAD file that is supplied to both a user and an approved printing supplier or suppliers, and further provides a license to a user that provides the terms and conditions under which the part may be produced. The authorized supplier may then produce the part under those conditions for the end user, thereby providing an authorized spare part manufactured using modern additive manufacturing techniques.

For example, one method may include the following operations: specifying the part to be printed; providing a license to said user; providing an enhanced AMF file to said user, said AMF file specifying the part to be printed; providing said enhanced AMF file to an approved printing supplier; and printing said authorized part.

In various embodiments, the method may further include providing a controlled copy of said enhanced AMF file to the user and to said authorized supplier to produce said part. In various embodiments, the method may further include providing a sensor for inspecting said part after printing. In various embodiments, said enhanced AMF file may include: a part identification, a product identification, and a license identification, wherein each of said part identification, product identification and license identification are features printed within the volume of part 1. In various embodiments, the enhanced AMF file may include: a part identification, a product identification, and a license identification, wherein each of said part identification, product identification and license identification are features embedded within the volume of part 1.

In various embodiments, the enhanced AMF file may include a safety feature printed within the volume of said part. In various versions, the method may further include: providing a sensor for inspecting said part identification, product identification and license identification printed within said part. In various embodiments, the method may further include providing a sensor for inspecting said safety feature printed within the volume of said part. In various versions, the safety feature may include a grid having a predetermined pitch on a portion thereof. In various embodiments, the safety feature may include at least one of a printed test pattern, a hologram structure, and a 3D QR code. In various embodiments, the safety feature may include a printed hologram structure.

In various embodiments, the method may further include providing a sensor for inspecting said safety feature grid to determine whether said grid is within a predetermined pitch range. In various versions, the sensor may include an optical sensor for measuring reflectance of said printed grid.

In various embodiments, the method may further include: providing a database to said authorized suppliers, said database having said part identification, product identification, and license identification listed for each licensed enhanced AMF file; and verifying that said printed part identification, product identification, and license identification in said printed part match said part identification, product identification, and license identification listed in said database.

In various embodiments, the method may further include: providing a radio frequency ID tag integral to said printed part; and interrogating said radio frequency ID tag to verify the authenticity of said printed part.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

As used herein for purposes of the present disclosure, the terms "3D printing" or "additive manufacturing" should be understood to be generally synonymous and include any method, process, or system used to produce a three-dimensional object where successive layers of material are deposited under computer control utilizing digital model data to create the object. Thus, the terms 3D printing and additive manufacturing include, but are not limited to, various three-dimensional object production methods such as any type of extrusion deposition, fused deposition modeling, fused filament fabrication or other extrusion processes, stereo lithography, digital light processing of photopolymers, laminated object manufacturing, directed energy deposition, electron beam fabrication, powder bed printing, inkjet head 3D printing, direct metal laser sintering, selective laser sintering, selective heat sintering, electron-beam melting, or selective laser melting. Furthermore, these additive manufacturing methods may be used to produce objects from a wide array of materials, including, but not limited to almost any metal alloy, metal foils, metal powders, ceramic powders, plastic films, powdered polymers, photopolymers, various ceramic materials, metal matrix composite materials, ceramic matrix composite materials, metal clays, thermoplastics, eutectic materials, rubbers, and even edible materials. Furthermore, the term "3D" printing may encompass objects produced by any known object modeling technique including but not limited to CAD (computer aided design) modeling, 3D scanner, or even conventional digital cameras and concomitant photogrammetry.

For purposes of this disclosure, the term "object" or "part" should be understood to refer to any 3D printed item, component, structure or fabrication produced or manufactured by any additive manufacturing technology using the methods and systems disclosed in this specification. Parts or objects may form a component or portion of a larger assembly or fabrication, or may be stand-alone.

The term "controller" is used herein generally to describe various apparatus relating to the operation of one or additive manufacturing systems or 3D printers. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "e-commerce" or synonymously "electronic commerce" refers to the conduct or transactions or facilitating the trade of services or products using computer networks such as the internet or online networks such as social networks. Electronic commerce can be conducted through mobile platforms such as smartphones or smart devices as well as desktop and laptop computing platforms. Electronic commerce may include various assistive technologies such as electronic funds transfer, database inventory management, supply chain management, web-based user interfaces, automated data collection systems, online marketplaces, electronic data interchanges, and various other forms of online or electronic financial and data exchanges.

The term "CAD" file or synonymously "AMF" file for purposes of this specification can refer to any additive manufacturing object specification having any of various file formats, including but not limited to open standard AMF file formats that are used to represent one object, or even multiple objects. It should be noted that 3D part or product designs are often made utilizing CAD file formats, while AMF files refer specifically to an additive manufacturing file format standard. However, either type of file may be employed in the embodiments disclosed in this specification without departing from the scope of the disclosure. The CAD or AMF file may refer to any file format that specifies the requisite parameters for additive manufacturing of an object, including but not limited to material or material used for printing, a volume for the part, a texture, a constellation if necessary, meta-data including a variety of information about the part being printed, compositions of multiple materials and proportions, in short, any information that can be required or specified for the additive manufacturing of a part or object. Unless otherwise specified (e.g., by explicitly mentioning the "AMF standard"), the term "AMF file" will be understood to not invoke any specific standard and to encompass any digital model file (whether according to the AMF, STL, X3D, etc. standards) useful for describing a structure for creation according to an additive manufacturing process.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein.

DETAILED DESCRIPTION

In the process of manufacturing a replacement part additive manufacturing of three-dimensional objects is a desirable method for supplying a component or stand-alone part. 3D printing of spare parts or assemblies overcomes many supply chain difficulties inherent in the process of supplying spare parts, such as inventory and shipping costs. Due to the need for an OEM or authorized parts manufacturer to control and/or monitor the quality of the part being supplied for a product, merely supplying an AMF file to an end user or purchaser and permitting them to print their own part does not assure that the part specified therein will be manufactured according to the OEM's standards. Furthermore, the widespread availability of scanning technologies enables an end user to cheaply produce a CAD file and thus attempt to manufacture their own replacement part, which is usually an inferior copy of the original since color, processing parameters, and material selection are not necessarily the same for a scanned copy. Accordingly, there is a need for manufacturing of replacement parts and/or assemblies through additive manufacturing processes that ensures the quality and integrity of the part produced thereby while retaining the flexibility of allowing a purchaser to produce their own part.

Figure 1:
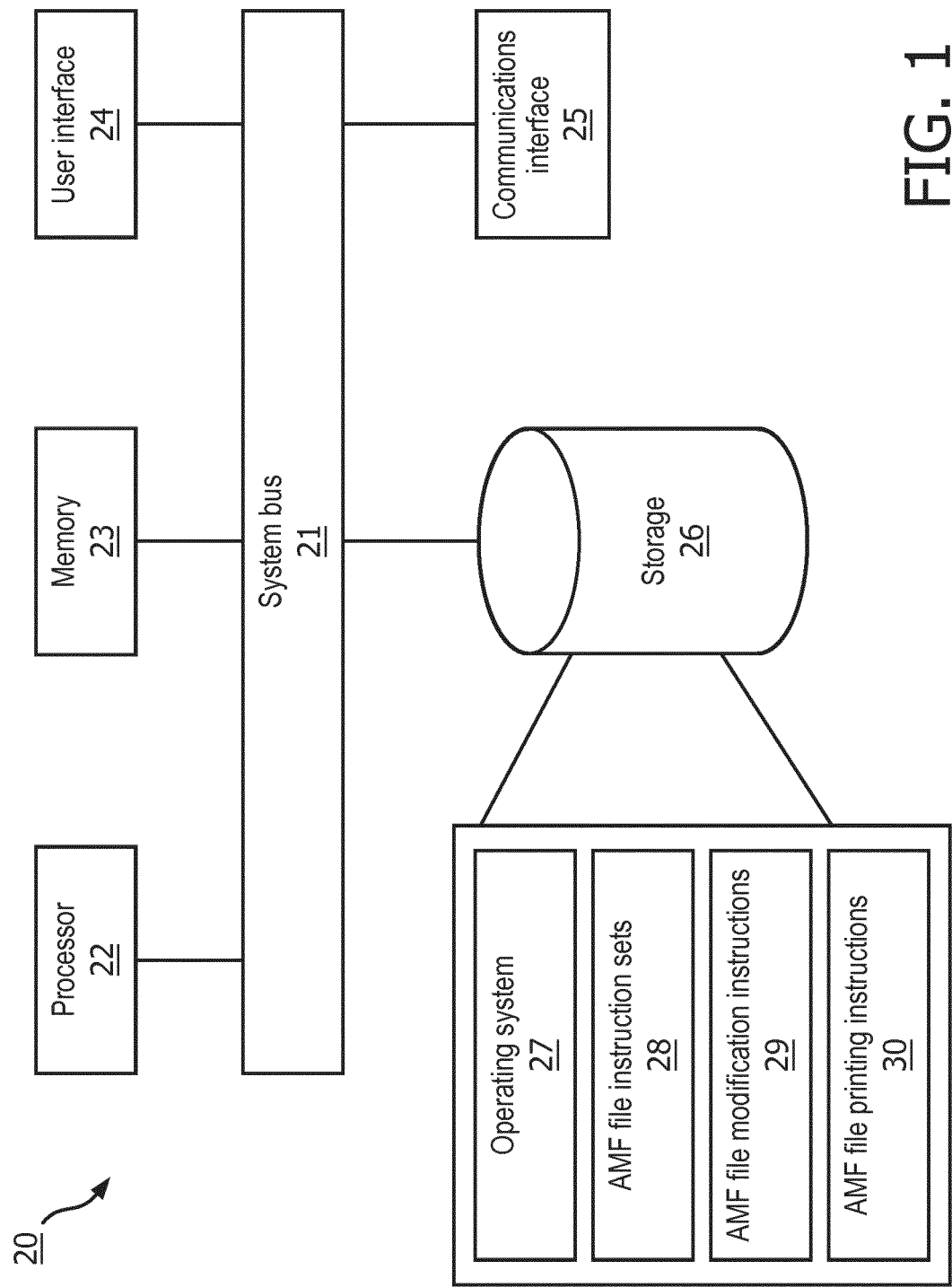
FIG. 1 is an exemplary system of operation in accordance with various embodiments.

FIG. 1 illustrates an exemplary hardware diagram 20 for implementing a system 10 for producing a replacement part or object 1. The device 20 includes a processor 22, memory 23, user interface 24, communication interface 25, and storage 26 interconnected via one or more system buses 21. It will be understood that FIG. 2 constitutes, in some respects, an abstraction and that the actual organization of the components of the device 20 may be more complex than illustrated.

The processor 22 may be any hardware device capable of executing instructions stored in memory 23 or storage 26 or otherwise processing data. As such, the processor may include a microprocessor, field programmable gate array (FPGA), application-specific integrated circuit (ASIC), or other similar devices.

The memory 23 may include various memories such as, for example L1, L2, or L3 cache or system memory. As such, the memory 23 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 24 may include one or more devices for enabling communication with a user such as an administrator. For example, the user interface 24 may include a display, a mouse, and a keyboard for receiving user commands. In some embodiments, the user interface 24 may include a command line interface or graphical user interface that may be presented to a remote terminal via the communication interface 25.

The communication interface 25 may include one or more devices for enabling communication with other hardware devices. For example, the communication interface 25 may include a network interface card (NIC) configured to communicate according to the Ethernet protocol. Additionally, the communication interface 25 may implement a TCP/IP stack for communication according to the TCP/IP protocols. Various alternative or additional hardware or configurations for the communication interface 25 will be apparent.

The storage 26 may include one or more machine-readable storage media such as read-only memory (ROM), random-access memory (RAM), magnetic disk storage media, optical storage media, flash-memory devices, or similar storage media. In various embodiments, the storage 26 may store instructions for execution by the processor 22 or data upon with the processor 22 may operate. For example, the storage 26 may store a base operating system 27 for controlling various basic operations of the hardware 20. The storage 26 may also include one or more AMF file instruction sets 28 (i.e., AMF files) for defining a model of an object for printing. It will be appreciated that such AMF file instruction sets 28 may include instructions (such as code) for directing a 3D printer to create a defined object or may include data defining the shape to be produced while other instructions (not shown) instruct the printer in how to fabricate the item. The storage may also include AMF file modification instructions 29 for inserting a safety feature into one or more of the AMF file instruction sets (when properly licensed) before fabrication for use in post-fabrication verification; and AMF file printing instructions 30 for transmitting AMF file (as modified by the modification instructions 29) to a 3d printer or otherwise controlling such a printer to fabricate an item described by the AMF file instruction set.

It will be apparent that various information described as stored in the storage 26 may be additionally or alternatively stored in the memory 23. In this respect, the memory 23 may also be considered to constitute a "storage device" and the storage 26 may be considered a "memory." Various other arrangements will be apparent. Further, the memory 23 and storage 26 may both be considered to be "non-transitory machine-readable media." As used herein, the term "non-transitory" will be understood to exclude transitory signals but to include all forms of storage, including both volatile and non-volatile memories.

While the host device 20 is shown as including one of each described component, the various components may be duplicated in various embodiments. For example, the processor 22 may include multiple microprocessors that are configured to independently execute the methods described herein or are configured to perform steps or subroutines of the methods described herein such that the multiple processors cooperate to achieve the functionality described herein. Further, where the device 20 is implemented in a cloud computing system, the various hardware components may belong to separate physical systems. For example, the processor 22 may include a first processor in a first server and a second processor in a second server.

Figure 2:
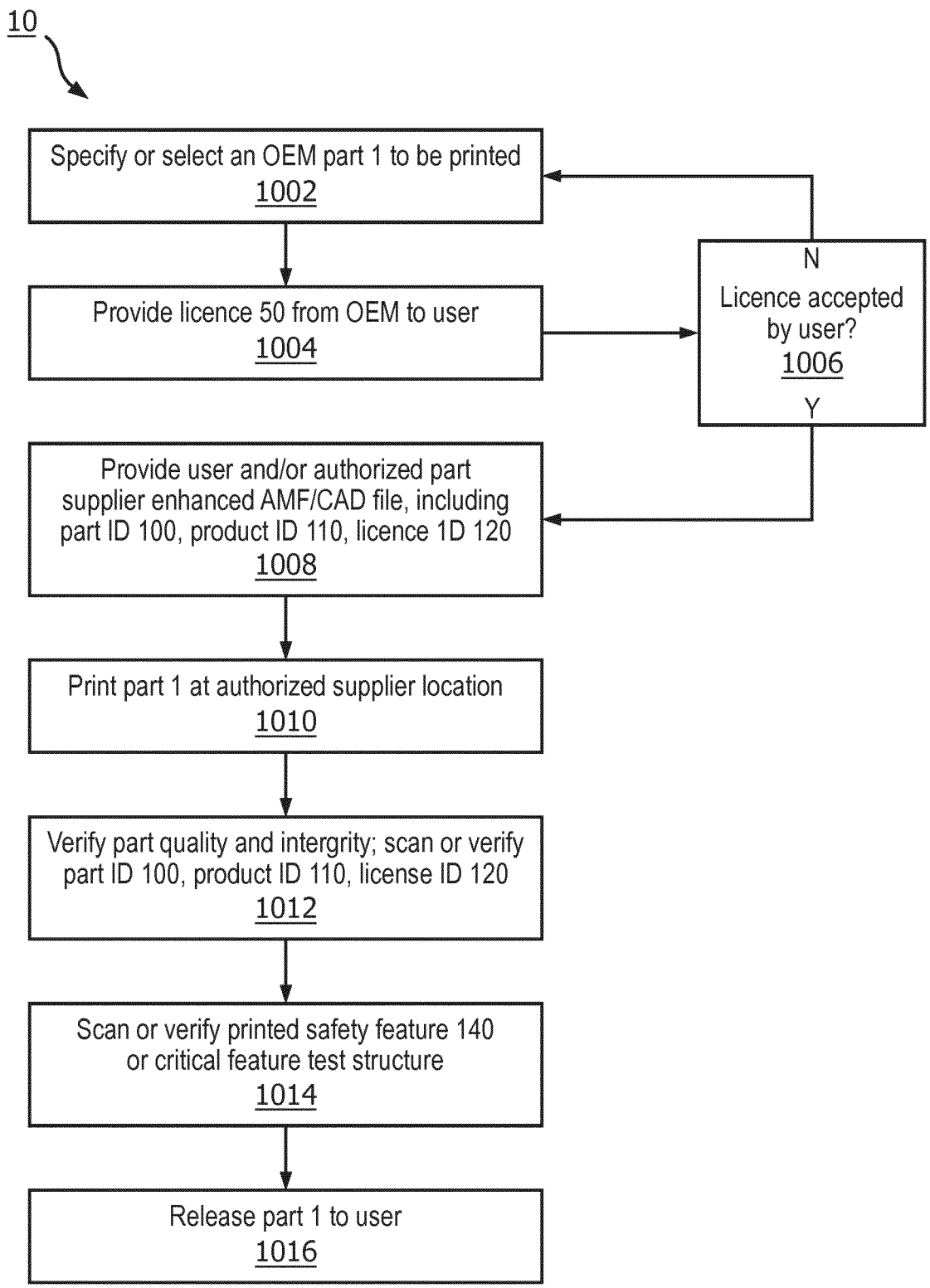
FIG. 2 is a block diagram of a process used to implement techniques described herein, in accordance with various embodiments.
Figure 3:
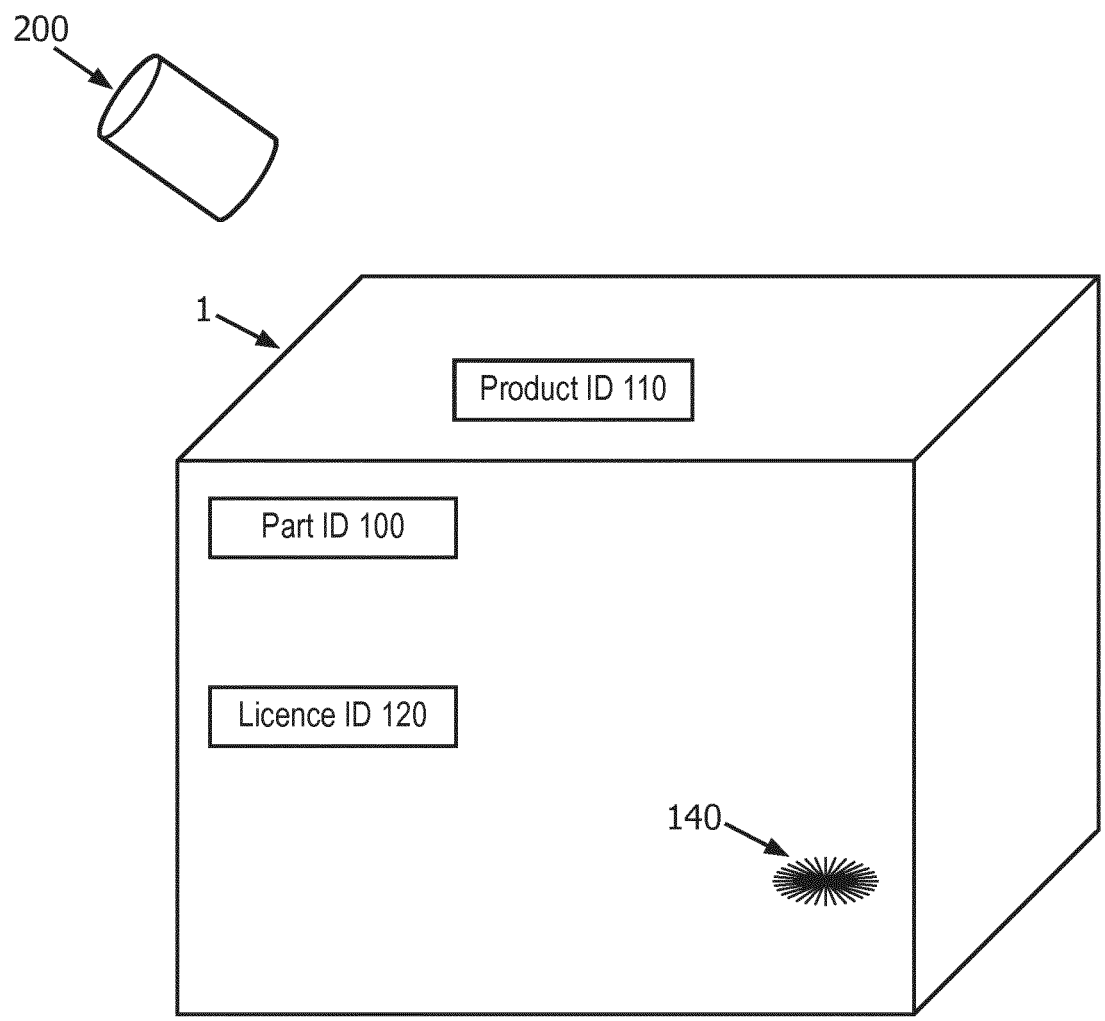
FIG. 3 depicts a system in accordance with various embodiments.

Referring now to FIGS. 2 and 3, in some embodiments, a system/process 10 for an original equipment manufacturer (OEM) or authorized parts supplier to produce a replacement part or object 1 is initiated when, at block 1002, an end user specifies the desired part 1 or component of manufacture required as a replacement for an existing product. The part 1 can be any component or portion of a larger assembly, for example a part 1 that is subject to wear or breakage and that may need to be periodically replaced. Almost any replacement part 1 that can be replaced by a user may be provided by the system 10 of the disclosure. Once a specified part 1 is selected or requested by a user, at block 1004, the OEM provides a license 50 for the user's review and acceptance that specifies the rights and obligations of the OEM provider and the user regarding the purchase and use of the replacement part 1.

In accordance with some aspects of the disclosure, the OEM license 50 may be provided as a "click-wrap" type license 50 commonly used in licensing software, wherein the user is prompted (block 1006) to agree to the terms of the license 50 prior to completing the part 1 purchase transaction. It should be noted that in some embodiments, the license 50 and part 1 purchase transaction may be conducted between a user and an OEM via a web browser interface, wherein the OEM provides a website to interact with users (customers) to purchase parts 1. Additionally, one of ordinary skill in the art will recognize that a wide variety of transaction types may be used in conjunction with the process 10 of the disclosure. In person transactions, e-commerce transactions and mail transactions are several non-limiting examples of parts 1 purchases in accordance with process 10. It should be further appreciated that a wide variety of 3D printing (or synonymously additive manufacturing) systems may be employed to practice the various embodiments of the disclosure disclosed herein. 3D printing systems utilizing controllers, processors, and concomitant systems for material deposition may be used to practice the inventive embodiments detailed in this specification without departing from the scope of the disclosure.

In various embodiments of the disclosure, the user must accept the terms of the license agreement, for example by clicking or selecting an appropriate icon or box in an e-commerce transaction example. Once a user has agreed to the license 50, at block 1008, the OEM provides an enhanced AMF file to the user, either by providing a software download or by providing the enhanced AMF file saved in data memory. In various aspects of the disclosure the OEM charges the user a predetermined fee for licensing the spare part, for example by conducting a credit card or gift card e-commerce transaction. Of course, any method of exchange may be employed in the purchase of the part 1 license 50 without departing from the scope of the disclosure. The licensed AMF file, in accordance with some aspects of the disclosure, would permit the purchaser to replace the part 1 within a pre-defined time period according to the parameters set forth in the license 50. In some embodiments, the OEM may permit the purchaser's product warranty to remain intact by purchase of the license 50 and proper use of the enhanced AMF file. Furthermore, the OEM may provide a new or conditional warranty for a part 1 manufactured in accordance with the license 50. In further aspects of the disclosure a copy of the licensed AMF file may be provided to a user selected authorized parts supplier to facilitate production of part 1. In some aspects of the disclosure the distribution of the licensed AMF file copy is provided only to a supplier that is predetermined or specified in advance by the purchaser and/or OEM. In alternative embodiments the licensed AMF file copy is protected from additional copying or distribution such that only a single use is permitted (only a single part may be produced with the license provided for each AMF file). In some aspects of the disclosure a blockchain ledger-type code may be embedded or employed with each licensed AMF file to enable distribution of the licensed AMF file to a plurality of suppliers, while only permitting a predetermined single copy or number of copies of the part 1 to be produced, in accordance with the terms and conditions of the license 50 purchased by the user. This feature of the disclosure provides a "controlled" AMF copy to the supplier or printer, thereby controlling the manufacturing process of part 1 as licenses 50 are sold.

In various embodiments the enhanced AMF file associated with the licensed part 1 may include information and defined parameters specific to the part 1 and the process approved for use in manufacturing the part 1. The AMF part file may include a part identification (ID) 100 and a product identification (ID) 110 that are provided as printed features of part 1 to identify the part 1 being produced and the product or assembly for which part 1 is being supplied, respectively. Part ID 100 and product ID 110 may be any suitable alphanumeric string, symbol, logo, designation or visual indicator suitable for printing on or inside the volume of part 1. Alternatively and/or in addition to part ID 100 and product ID 110, the AMF file may further include a license file ID 120 that is also capable of being printed on or inside part 1 as the part is being produced. License file ID 120 also may include alphanumeric characters, symbols, logos, designations or visual indicators or any other identifier that operates to uniquely signify each license 50 supplied by the OEM. The license file ID 120 may also be printed in a visible or hidden fashion, either on the surface of part 1 or inside the volume thereof, as will be discussed further herein below.

In some embodiments of the disclosure the part ID 100 and product ID are specified in the AMF file such that the file is not capable of being used for an unauthorized copied part 1. In this embodiment part ID 100 and product ID 110 are both specified in the AMF file, such that when part 1 is printed at block 1010, each feature is printed in a defined volume inside of or interior to part 1. Part ID 100 and product ID 110 may further be printed by a 3D printing process that varies the material texture and/or porosity in the areas in which part ID 100 and product ID 110 are located. In various 3D printing systems this process can be specified by, for example, varying the laser energy in a selective laser sintering process. In this aspect of the disclosure part ID 100 and product ID 110 may be printed as a three-dimensional identifier having a porosity or texture that differs from the other portions of part 1. Additionally and/or alternatively license ID 120 may also be printed three dimensionally by a process that varies the porosity and/or texture of the printed license ID. The printed ID's 100, 110, 120 may then be visually verified prior to releasing or providing part 1 to the purchaser, thereby ensuring the use of a licensed part. Furthermore, in some aspects the printed IDs 100, 110, 120 may be verified using a variety of methods, including but not limited to x-ray verification, electrical signal fingerprints, or a wide variety of sensor technologies that are capable of distinguishing and verifying the ID's 110, 110, 120.

Accordingly, and again referring to FIGS. 2 and 3, at block 1012, the part ID 100 may be validated or verified after part 1 is printed at block 1010 by incorporating a sensor 200 into the 3D printing system being used to produce part 1. At block 1014, sensor 200 and a concomitant processor may be operable to scan and verify the printed part ID 100 of the completed part 1 once it is finished printing, prior to releasing the part to the user at block 1016. In some embodiments an optical sensor 200 may be used to verify part IDs 100 of completed parts 1. Sensor 200 may also comprise a high resolution image sensor with multi-wavelength capabilities. Sensor 200 may also comprise an x-ray detector, a frequency sensor, an RFID interrogator, and ultrasound detector, or any of a wide variety of sensors 200 capable of measuring a difference in the material at part ID 100 when the ID being verified. Additionally, sensor 200 may be used to verify the printed product ID 110 and also the license ID 120 in accordance with other embodiments. Once part 1 is completed, its quality and provenance may be verified by confirming the presence of printed IDs' 110, 110, and 120 through operation of sensor 200. Sensor 200 may be mounted or positioned within the authorized 3D printer, or proximate the printing system for use by an operator after printing part 1.

Additionally and/or alternatively, in some embodiments wherein part 1 is being provided for an assembly or product that is more complex and includes a processor or controller, sensor 200 may be provided as an integral component of the assembly for which part 1 is being printed. In some embodiments the assembly may include a processor 22 and memory 23 that is required to control or operate the assembly. In these embodiments the assembly may be designed to be inoperable until sensor 200, coupled to processor 22, gathers information from the part identification, and for example verifies the requisite part ID 100, product ID 110, and/or license ID 120 is in fact authorized. In yet further aspects of the disclosure, the where the assembly for which part 1 is being printed includes an operator interface, the part ID 100, product ID 110 and license ID 120 may be required to be provided via operator interface to operate the assembly. In these embodiments part ID 100, product ID 110 and license ID 120 are not available to be entered until part 1 is printed, thereby assuring part quality and adherence to license 50 conditions. In some embodiments of the disclosure, part 1 may be printed to contain or enclose a microchip, for example an RFID chip, that may then be interrogated or otherwise detected by sensor 200 to verify the ID's of part 1. The microchip may be programmed to include the ID's 100, 110 and 120 that are also present in enhanced AMF file so that once sensed, the microchip confirms the part IDs.

In other aspects of the disclosure wherein a critical part 1 tolerance or dimension is absolutely necessary for proper operation, a safety feature 140 may be included as an integral part of the licensed AMF file wherein the safety feature 140 is a printed element such as a fine pitch printed grid or grating provided in the area of criticality. In these embodiments the critical feature is printed having the fine pitch grid as an integral part thereof so that sensor 200 may be used to verify a proper predetermined valid range for the critical feature or dimension before part 1 can be sold or released. In an exemplary but non-limiting embodiment a critical parameter may be the spatial resolution and homogeneity of the printed part 1, so that a grid 140 with fine pitch is printed as a test structure inside the part 1. The printed grid 140 pitch thus forms a part of the critical or safety feature of the printed part 1, and the printed grid 140 may then be verified with an optical sensor 200 that measures a typical reflectance/transmission value of the grid 140. Only if the reflectance/transmission detected by sensor 200 is within a predetermined acceptable range is the spare part 1 accepted.

Depending on the printing materials specified and the printing technology employed a wide variety of different safety features 140 may be printed integral to part 1 without departing from the scope of the disclosure. In some exemplary but non-limiting embodiments printed test patterns, hologram-like structures, 3D QR code files, material property changes (color, density), dimensional features and positional features may be printed and then verified by sensor 200 to ensure part 1 quality and integrity. Additionally, materials having specified electrical conductivities may be employed and printed in various patterns integral to part 1 so that a variety of electrical test measurements such as resistance, frequency response, resonance, conductivity, and switching response times can also be conducted by the part supplier to ensure part 1 quality.

In various embodiments, the 3D printing process may further incorporate a radio-frequency identification tag (RFID) and/or an optical ID tag and/or a microchip with direct contact readout or wireless capability that may only be supplied and/or printed by authorized 3D printing suppliers. The RFID or optical tags can then be interrogated or read to verify proper part 1 quality and supply chain integrity. This feature of the disclosure provide a further quality assurance to the OEM that part 1 is provided according to their specifications.

In some embodiments of the disclosure the part ID 100, product ID 110 and license ID 120 that form a part of the licensed AMF file are also provided to authorized parts suppliers a part of a supplier or vendor database which may be readily accessible to all authorized part 1 suppliers. The part suppliers can therefore serve as an additional verifier that part 1 is in fact properly licensed, since only licensed parts 1 will be listed in the vendor/supplier database. Once part 1 is printed, the part/product/license ID's can be cross-checked against those ID's listed in the authorized supplier/vendor database, thereby confirming the authorized production of the part 1.

Furthermore, in some aspects of the disclosure the licensed AMF file and supplier database may both include ancillary or related part 1 information, such as the number of times the part 1 has been replaced, past part IDs, a production authorization code that must be entered prior to authorized printing of the part 1, or any of a wide variety of parameters for part 1 that operate to ensure part 1 quality. Additionally and/or alternatively, a material batch identification or an authorized printer identification may be required to be entered into the authorized supplier database prior to receiving an authorization to produce part 1 This feature of the disclosure permits a part 1 supplier to track the printer and/or part supplier and/or the material batch used to produce part 1 in order to assure the quality of the part 1 produced. For example, if the printer is found to have a problem, or if the material batch is found to have out of tolerance grain size distribution, this information can be provided to the OEM to enable immediate corrective action to be taken.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A system for producing a part for an assembly by three-dimensional printing of a material, said part authorized for production by an authorized supplier, comprising:
a processor and concomitant memory, said processor configured to;
insert at least one identifier in an AMF file instruction set, said identifier including information required for authorized production of said part, wherein the AMF file instruction set causes a corresponding printed identifier to be positioned inside a volume of the printed part at a specified location; and
insert a license identification feature into said AMF file instruction set, wherein the AMF file instruction set causes said license identification feature to be printed within a volume of said part.

2. The system of claim 1 wherein said processor is further configured to create an authorized copy of said AMF file and transmit said file to said authorized supplier to produce said part.

3. The system of claim 1 wherein said processor is further configured to insert an identification feature into said AMF file instruction set, said identification feature printed within a volume of said part.

4. The system of claim 3 further comprising:
a sensor coupled to said processor for inspecting said identification feature printed within said part to verify authorized production of said part.

5. The system of claim 4 wherein said sensor is disposed within a three-dimensional printing system.

6. The system of claim 4 wherein said sensor is disposed within the assembly for which said part is produced.

7. The system of claim 4 wherein said sensor comprises an optical sensor for measuring reflectance of an identification feature.

8. The system of claim 4 wherein said sensor comprises:
a one of a high resolution image sensor, an x-ray detector, a frequency sensor, an RFID interrogator, and an ultrasound detector.

9. The system of claim 1 wherein said processor is further configured to insert a part identification feature into said AMF file instruction set, said part identification feature printed within a volume of said part.

10. The system of claim 1 wherein said processor is further configured to insert a product identification feature into said AMF file instruction set, said product identification feature printed within a volume of said part.

11. The system of claim 1 wherein said processor is further configured to insert a safety feature into said AMF file instruction set, said safety feature printed within a volume of said part.

12. The system of claim 11 wherein said safety feature comprises a printed grid having a predetermined pitch on a portion thereof.

13. The system of claim 11 wherein said safety feature includes at least one of a printed test pattern, a hologram structure, and a 3D QR code.

14. The system of claim 11 wherein said safety feature is printed inside the part.

15. The system of claim 1, wherein
the printed identifier is comprised of a material different from other portions of the part, and/or
the printed identifier has a porosity different from other portions of the part.

16. The system of claim 1, wherein the printed identifier is printed by varying the laser energy in a selective laser sintering process, the printed identifier having a porosity or texture different from other portions of the part.

17. A system for utilizing an authorized spare part in an existing assembly, said assembly having a processor and concomitant memory for operating said assembly, said system comprising:
an identification feature within the volume of said spare part, wherein a corresponding printed identifier is positioned inside a volume of the printed part at a specified location;
a license identification feature within the volume of said spare part, wherein a corresponding license identifier is positioned inside a volume of the printed part; and
a sensor coupled to said processor for gathering information from said identification feature related to the authenticity of said part.

18. The system of claim 17 wherein said sensor comprises:
a one of a high resolution image sensor, an x-ray detector, a frequency sensor, an RFID interrogator, and an ultrasound detector.

19. The system of claim 17 wherein said identification feature comprises:
a printed grid having a predetermined pitch on a portion thereof.

20. The system of claim 17 wherein said identification feature comprises:
a microchip embedded within the volume of said part.

21. A system for providing an authorized part from an authorized part supplier to a user comprising:
a license authorizing said user to produce said part at an authorized part supplier;
an AMF file having a unique part identification embedded therein, said part identification forming a portion of the printed volume of said part, the AMF file further comprising a license identification embedded therein, said license identification forming a portion of the printed volume of said part; and
a sensor for inspecting said part identification of said printed part.

22. The system of claim 21 wherein said AMF file further comprises:

an embedded product identification, said product identification forming a portion of a printed volume of said part; and wherein said sensor inspects said product identification of said printed part.

23. A method for producing a part by three-dimensional printing of a material, said part being authorized for production by an authorized supplier comprising:

specifying the part to be printed through an AMF file;

transmitting said AMF file to said user;

transmitting a license to said user;

receiving acceptance of said license from said user;

inserting at least one identifier in an AMF file instruction set, wherein a corresponding printed identifier is positioned inside a volume of the printed part at a specified location;

inserting at least one license identifier in the AMF file instruction set, wherein a corresponding printed license identifier is positioned inside a volume of the printed part;

transmitting said AMF file to an approved printing supplier; and printing said authorized part.

24. The method of claim 23 further comprising:

embedding a safety feature within said AMF file, said safety feature to be printed within the volume of said part, said safety feature capable of being inspected by a sensor.

* * * * *